US006410114B1

(12) United States Patent
McDonald

(10) Patent No.: US 6,410,114 B1
(45) Date of Patent: Jun. 25, 2002

(54) FOLDED SHEET MATERIALS

(76) Inventor: George Wallace McDonald, Mon Cachet, Rue de la Cache, Castel, Guernsey, Channels Islands (GB)

( * ) Notice: Subject to any disclaimer, the term of this patent is extended or adjusted under 35 U.S.C. 154(b) by 0 days.

(21) Appl. No.: 09/468,563

(22) Filed: Dec. 21, 1999

(30) Foreign Application Priority Data

Dec. 23, 1998 (GB) ............................................. 9828499

(51) Int. Cl.[7] .................................................. B32B 3/04

(52) U.S. Cl. ..................... 428/64.1; 428/66.6; 428/124; 428/130; 428/101; 428/223; 428/126; 40/495; 283/34

(58) Field of Search ................................. 428/126, 130, 428/121, 124, 64.1, 101, 66.6, 77, 223; 283/34; 40/495, 124.09, 124.191; 235/78 R

(56) References Cited

U.S. PATENT DOCUMENTS 1,686,677 A * 10/1928 Bishop ........................ 40/495
3,708,898 A * 1/1973 Cornelius .................... 40/495

* cited by examiner

*Primary Examiner*—Alexander S. Thomas
(74) *Attorney, Agent, or Firm*—J. Harold Nissen; Lackenbach Siegel

(57) ABSTRACT

The invention provides a sheet material (10) having a first set of folds, the sheet material further comprising a rotatable disc (8) attached thereto.

25 Claims, 3 Drawing Sheets

FOLDED SHEET MATERIALS

FIELD OF THE INVENTION

The present invention relates to folded sheet materials, regardless of whether in the folded or unfolded condition.

BACKGROUND TO THE INVENTION

It is known to fold maps with a first set of vertical concertina folds (which term means that the folds are alternately towards and away from the front of the sheet) and, once the map is folded, to impose a second set of folds (not concertina) that are horizontal. It is further known for such a map to have a stiffening portion which extends over the whole of one corner segment produced by the folds and beyond this for a similar area outside the map so that when the map has been folded completely the outside stiffened portion can be folded over the map so that the map is wholly contained between the two parts of the stiffened portion that are hinged together.

It is known, for instance from U.S. Pat. No 5,156,898 to provide a sheet of paper or like material having a first and a second set of concertina folds with the second set of folds being transverse to the first set when the sheet is folded. The sheet is provided with two stiff portions at diagonally opposite corner segments of the sheet, so that the sheet can be unfolded with a single movement and possibly using only one hand to grasp and unfold the sheet.

SUMMARY OF THE INVENTION

For the purposes of the ensuing description and claims, “sheet material” is hereby defined as a sheet material which has folds in it, regardless of whether it is in a folded condition or not unless the context otherwise requires, and further is a material that takes folds at which it can easily be unfolded (without the folds disappearing) and refolded. It may be paper, or a paper-like material such as plastics sheet on which books are commonly printed, or may be very thin card or any other suitable flexible material. It is conceivable that the sheet material may be stiff except at the folds, e.g. very thin cards interconnected by paper or cloth, but this is deprecated as not allowing full realisation of the advantages of the invention.

The present invention provides a sheet material having a first set of folds the sheet material further comprising a rotatable disc attached thereto.

Suitably, the sheet material is provided with a stiff portion at a segment thereof. Suitably, the segment at which the stiff portion is provided is at a corner of the sheet and is defined by fold(s) and/or edge(s) of the sheet.

Suitably, the first set of folds is concertina folds.

Suitably, the rotatable disc is attached to the stiff portion of the sheet means. Suitably, the rotatable disc is located on the exterior surface of the stiff portion when the sheet is in the folded condition.

Suitably, the stiff portion to which the rotatable disc is attached has a cut-out section which facilitates rotation of the disc.

Suitably, the disc comprises one or more cut-out sections or slots, such that information given on the stiff portion may be selectively viewed through the cut-out section(s) or slots. Alternatively, the disc may comprise selectively translucent, preferably transparent, sections for the same purpose.

Suitably, the disc comprises cardboard material, plastics material or a combination thereof. The plastics material suitably comprises opaque and transparent sections, although it may additionally or alternatively comprise cut-out slots. The disc may further comprise markings on the surface thereof.

Suitably, the disc is a substantially flat disc. The disc may comprise a projection on the surface thereof, which projection helps or provides for rotation of the disc.

Suitably, the disc is connected to the sheet material at the centre of the disc by attachment means. Suitably, the disc rotates about the attachment means. The attachment means may comprise a pin or rivet, for example.

The disc may have any shape, such as circular, elliptical, square or rectangular, but is preferably circular.

The sheet material may comprise only a first set of folds.

Suitably, the sheet material comprises a second set of folds, which second set of folds may comprise a single fold. Suitably, the second set of folds is a set of concertina folds. Suitably, the second set of folds are arranged so as to be transverse to the first set of concertina folds.

Suitably, the sheet material further comprises a second stiff portion located at a segment of the sheet, which segment is defined by edge(s) and/or fold(s) of the sheet. Preferably, the segments at which the first and second stiff portions are located are at or near diagonally opposite corners of the sheet. This enables the sheet material to be unfolded in a single movement in which one hand grasps one of the stiff portions and the other hand pulls the other stiff portion away from the first one.

Although one or both sets of folds may be non-parallel, e.g. convergent, and/or one or both of the stiff portions may, when the sheet is properly folded, not be outer portions, in a preferred embodiment the sheet is rectangular, the sets of folds being mutually perpendicular and parallel to the respective edges of the sheet, and the stiff portions being such as to be at the outside of the sheet when it has been folded by the first set of folds and then by the second set of folds and being at least as large as the respective segments of the sheet.

In this case, and particularly if the first set consists of an odd number of folds and the second set consists of an even number of folds, one hand can grasp the back stiff portion whilst the other hand can grasp the front stiff portion and pull it downwards and then sideways turning it over, so as to open the sheet with what in practice amounts to a single movement, assuming the sheet to be flexible at and near the folds.

By experiment, the most suitable folding for this action has been found to comprise five folds in the first set and two folds in the second set. Furthermore, if the stiff portions are slightly larger than the respective corner segments of the sheet it is easier to grasp the stiff portions.

Also, it is relatively simple to reverse the action and fold up the sheet again with a single movement. If this facility is then combined with the stiff portions being provided with holding means adapted to hold the portions together to keep the sheet folded, a particularly convenient embodiment is provided, one which can be rapidly unfolded and rapidly refolded and kept in position without undue fiddling. The holding means may comprise oppositely magnetised parts of the respective stiff portions or (though this has not been found so effective) may comprise hooked material and looped material at the respective stiff portions.

The invention is particularly suited to printed sheet material intended to be carried around in the pocket (e.g. for the uses indicated below) for which purpose the folds may divide the material into segments about 4 to 8 cm in width by about 6 to 12 cm in length. It is preferred that the whole package should be roughly the size of a credit card, i.e. with folds dividing the sheet rectangularly into segments of about 5 to 5½ cm width by about 8 to 8½ cm length.

In a preferred embodiment, the material (apart from the stiff portions) is paper or paper-like material (e.g. of plastics) and the stiff portions are of semi-rigid material, principally of plastics (e.g. apart from magnetisable material for the purpose mentioned above), attached to the remainder of the material.

An embodiment which has particular uses in awkward situations is produced if at least one of the said diagonally opposite stiff portions (usually the front one) is sufficiently massive to allow a single-handed holding and opening of the sheet. In this case, the back stiff portion is held in one hand with the massive front portion resting lightly on the remainder of the folded material and then this is jerked so that the massive front portion flies away from the grasped back portion, thus automatically enabling the sheet to be held and opened, both with one hand.

BRIEF DESCRIPTION OF THE DRAWINGS

The present invention will now be described, by way of example only, with reference to the drawings that follow; in which.

DESCRIPTION OF PREFERRED EMBODIMENTS OF THE INVENTION

Figure 1:
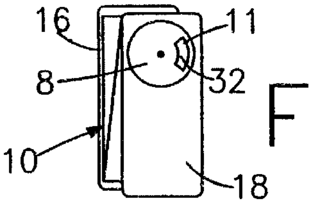
FIG. 1 illustrates a sheet material in accordance with the present invention in the folded condition.

FIG. 1 illustrates a folded sheet 10 having stiff portions 16 and 18 at segments of the sheet, such that when the sheet 10 is in the folded condition (as shown) the stiff portions 16, 18 are at the outside of the sheet. As can be seen from FIG. 1, the stiff portions 16, 18 have dimensions which are slightly greater than the dimensions of the segment of the sheet 10 to which they are attached.

The front stiff portion 18 comprises a rotatable disc 8 which disc 8 is made of plastics material and has a slot 11 cut out of a section thereof. The opening in the disc 8 provided by the slot 11 reveals information 32 printed on the stiff portion 18. The disc 8 rotates about attachment means 9, which is provided at the centre of the disc 8 in the form of a pin.

Figure 4:
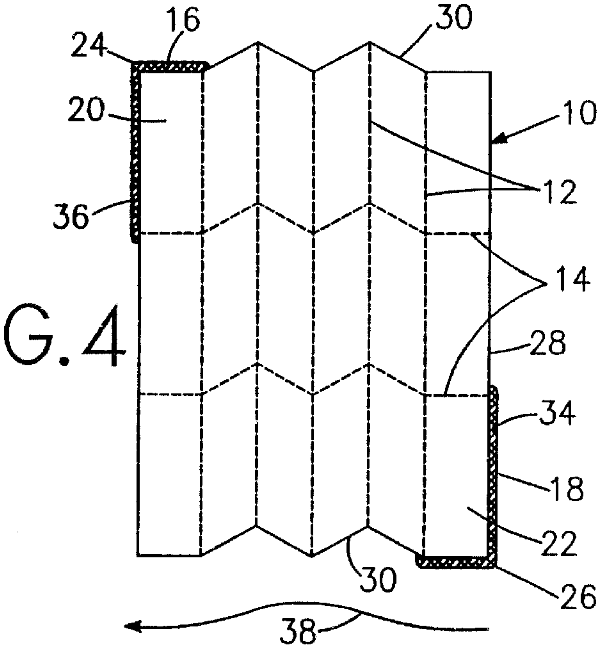
Figure 5:
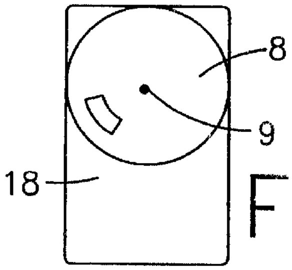
FIGS. 5, 6 and 7 show variations of arrangement of the stiff portion and rotatable disc of FIG. 1.
Figure 6:
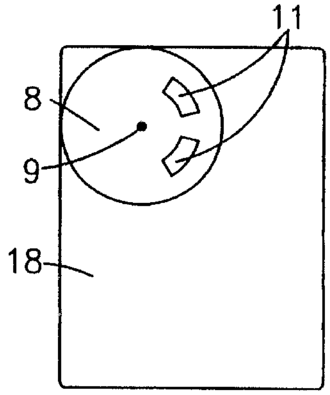
Figure 7:
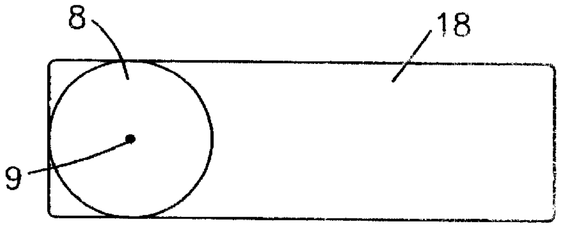

FIG. 4, in particular, shows the sheet material of the present invention in an unfolded condition. It can be seen from FIG. 4, that the sheet material comprises a sheet of paper 10 having a first set of concertina folds 12 and, so as to be transverse to the first set of folds 12 when the sheet 10 is folded, a second set of concertina folds 14. The sheet 10 being provided with first and second stiff portions 16 and 18 having defined edges and being located diagonally opposite one another at segments 20, 22 of the sheet 10, which segments are at diagonally opposite corners 24 and 26 of the sheet 10, and are defined by folds 12, 14 and edges 28, 30 of the sheet 10.

The sheet 10 is rectangular when flattened, as can be inferred from FIG. 4. The sets of folds 12, 14 are mutually perpendicular and parallel to the respective edges 28, 30 of the sheet 10. The stiff portions 16, 18 are such as to be located at the outside of the sheet 10 when it is in a folded condition (as shown in FIG. 1); the stiff portions 16, 18 being at least as large as the respective corner segments 20, 22 of the sheet 10.

As can be seen from FIG. 4, the first set of concertina folds 12 comprises an odd number of folds and the second set of concertina folds 14 comprises an even number of folds.

For ease of grasping and to protect the sheet 10 and its folds 12, 14, the stiff portions 16, 18 are in fact slightly larger than the respective corner segments 20, 22. Perhaps, larger by 2 mm if the segments are of credit card size (as discussed above and below).

The stiff portions 16, 18 are preferably provided with holdings means adapted to hold the stiff portions 16, 18 together to keep the sheet 10 in the folded condition. A particularly convenient method involves a magnetic arrangement, wherein small adjacent areas of each stiff portion 16, 18 are magnetised with alternate poles on the inside of each stiff portion 16, 18, which portions are paired such that oppositely magnetised parts of the portions 16, 18 face each other through the folded paper sheet 10. This is a known device and holds the portions 16, 18 closely together by a magnetic force bridging the thicknesses of the folded sheet 10 thus clamped between the portions 16 and 18.

An alternative embodiment is shown in FIG. 4, in which the holding means comprises strips 34, 36 of hooked material and looped material (e.g. that known under the trade name of VELCRO) at the respective portions 16, 18, though this is found in practice to be less convenient than the magnetic arrangement, as it requires a much larger margin of excess size of portions 16 and 18 over the size of the respective segments 20 and 22 and a much thinner paper sheet 10.

The embodiment is primarily directed towards use as a pocket-held device. As such, the preferred dimensions of the segments of the sheet 10 is about 4 to 8 cm side by 6 to 12 cm long. The most convenient size is that of a standard credit card.

The stiff portions 16, 18 are comprised of cardboard material, but may be comprised of any suitable material, for example, plastics material.

Figure 2:
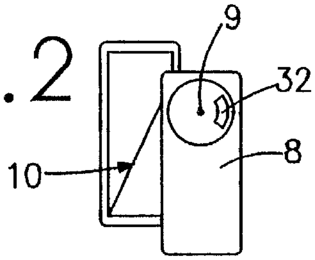
FIGS. 2, 3 and 4 illustrate the various stages of unfolding the sheet of FIG. 1.
Figure 3:
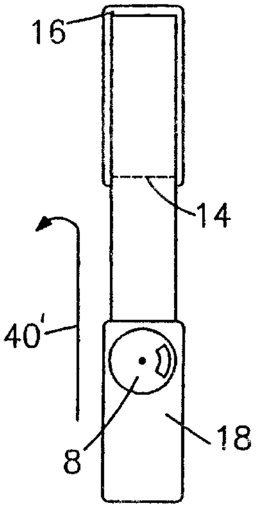

In use the rear stiff portion 16 is grasped in one hand and the front stiff portion 18 is either pulled away from the rear portion 16 by grasping with the other hand or the front stiff portion 18 is thrown outwards and downwards, to the right (as shown in FIGS. 2–4) so that the sheet 10 automatically passes through the positions shown successively in FIGS. 2–4. To close the sheet 10, the stiff portions 16 and 18 are grasped in the left and the right hands respectively, with the palms facing the viewer of FIG. 4, and the portion 18 is then brought with the right hand in a movement indicated by arrow 38 towards the left and turning over portion 18 until the sheet 10 reaches the position shown in FIG. 3. The movement is then continued upwards over and back as indicated by arrow 40 (FIG. 3) successively into the position shown in FIGS. 2 and 1.

Figure 8:
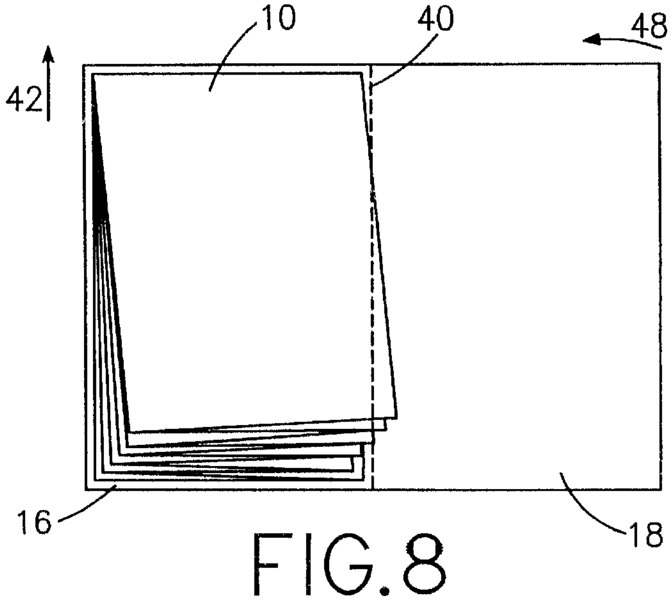
FIGS. 8 and 9 show an alternative embodiment of the present invention.

FIG. 8 illustrates an alternative embodiment of the present invention. In this embodiment, the rear stiff portion 16 and the front stiff portion 18 are attached to each other along the length of an edge thereof (in this case the long edge of the stiff portions although the stiff portions 16, 18 could equally be attached along the top, short edges thereof) . The stiff portions are hinged about fold 40. The folded sheet 10 is attached, preferably by adhesive, to the inner surface of the rear stiff portion 16.

Figure 9:
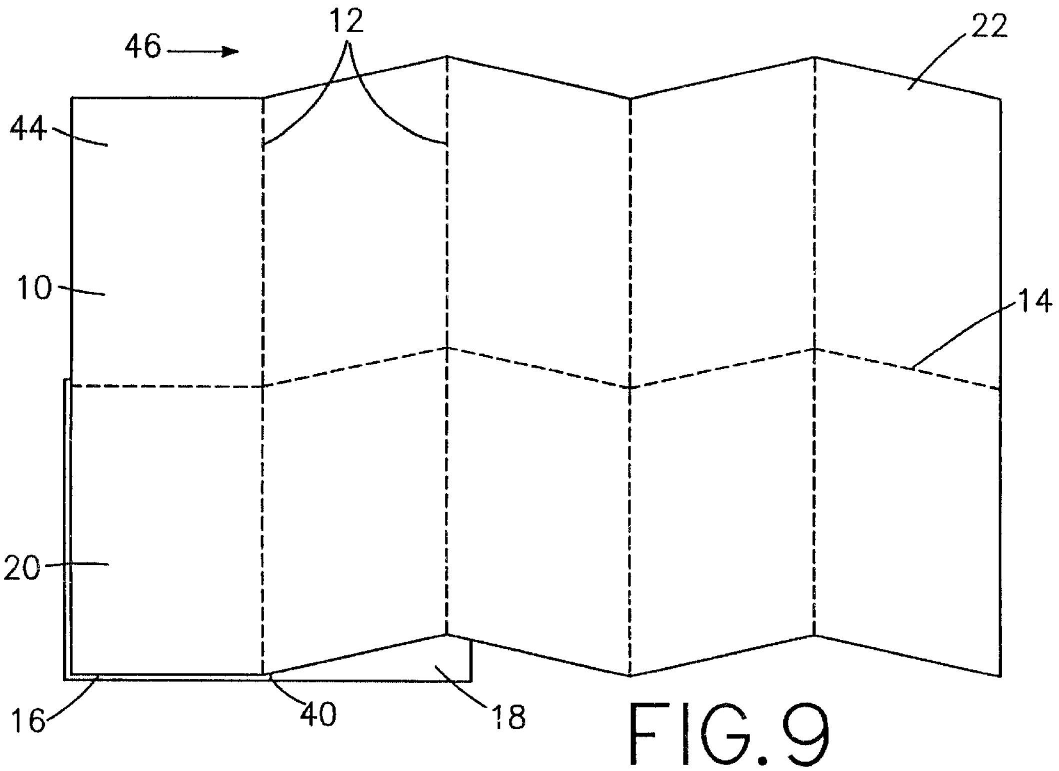

FIG. 9 shows the sheet material of FIG. 8 in a partially unfolded condition. It can be seen from FIG. 9, that the sheet 10 comprises a first set of concertina folds 12 and a second set of folds 14, which second set of folds 14 is transverse to the first set of folds 12. The second set of folds 14, as shown in FIG. 9, comprises only a single fold. However, in practice, the second set of folds 14 may comprise a plurality of folds. Preferably, the plurality of folds provide a second set of concertina folds, as per the second set of concertina folds of the embodiment of FIGS. 1 to 4.

As can be seen from FIG. 9, sheet means 10 is attached to rear stiff portion 16 at corner segment 20. To open the sheet of FIGS. 8 and 9, folded sheet 10 is unfolded by unfolding the upper rows of segments 44, in the direction shown by arrow 42, followed by pulling section 22 sideways away from section 20 to open the sheet fully, in the direction as shown by arrow 46.

The folded sheet 10 as shown in FIG. 8, is protected by folding the front stiff portion 18 over the top of the folded sheet 10 and the rear portion 16 in the direction as shown by arrow 48.

Figure 10:
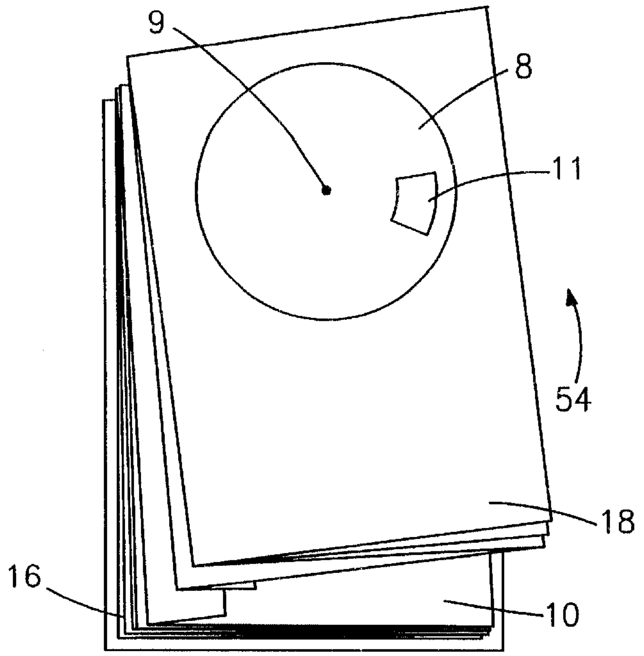
FIGS. 10 and 11 show a yet further embodiment of the present invention.
Figure 11:
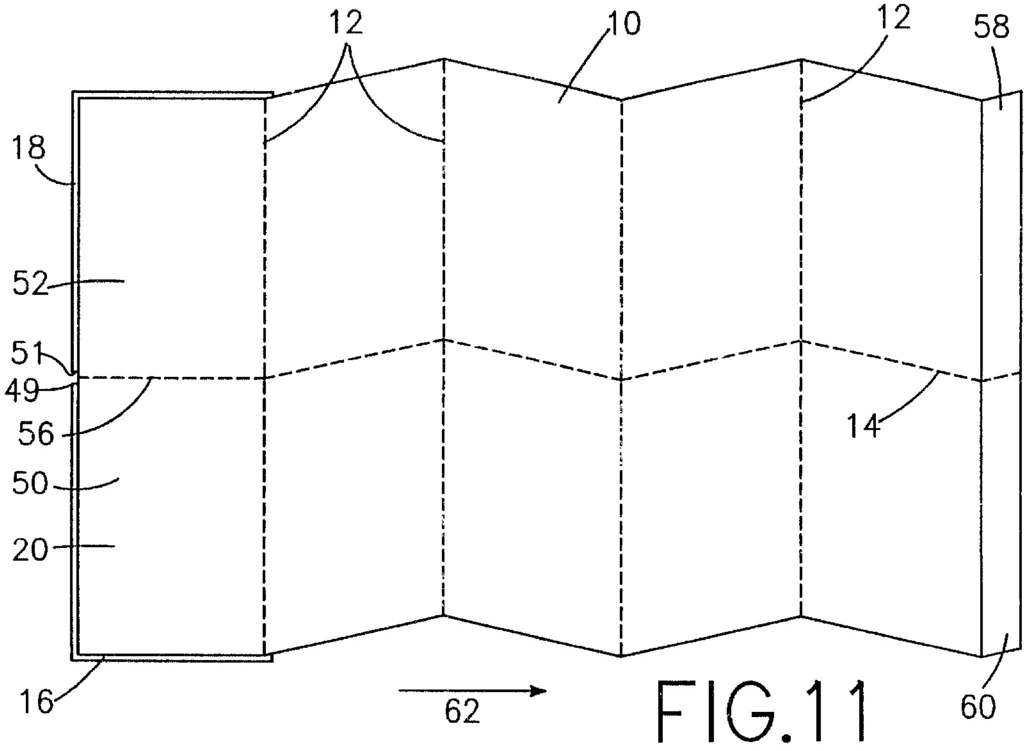

FIGS. 10 and 11 show a further embodiment of the present invention. FIG. 10 shows this further embodiment in the folded condition, wherein the sheet 10 comprises a rear stiff portion 16 and a front stiff portion 18 attached to adjacent segments 50, 52 respectively of the sheet 10. A rotatable disc 8 is attached to the exterior surface of the front stiff portion 18. The rotatable disc 8 is attached to the front stiff portion 18 by means of pin 9, about which pin 9 the rotatable disc 8 can be rotated. The rotatable disc 8 further comprises a cut-out slot 11 through which information printed on the front stiff portion 18 can be selectively viewed.

In the folded condition, the front stiff portion 18 lies on top of the rear stiff portion 16, with the folded sheet 10 therebetween. To open the sheet 10 the front stiff portion 18 is unfolded in the direction shown by arrow 54.

In the embodiment illustrated, the front stiff portion 16 and the rear stiff portion 18 are not attached to one another. However, the front and rear portions may be joined to one another at adjacent sides 49, 51, about which joint the portions are hinged. Instead, the stiff portions 16, 18 are attached (preferably by adhesive) to segments 50 and 52 respectively of the sheet 10. The stiff portions 16, 18 are unfolded by rotation about fold 56 of the sheet 10.

To open the sheet 10 fully segment 58 or 60 of the sheet 10 is pulled away from the stiff portions 16, 18, in the direction illustrated by arrow 62.

The sheet illustrated in FIGS. 10 and 11 comprises a first set of folds 12 which is a set of concertina folds, and a second set of folds 14 which are transverse to the first set of folds. As illustrated, the second set of folds 14 comprises only a single fold. However, the second set of folds 14 may comprise any odd number of folds, preferably in the form of a set of concertina folds. The preferred embodiment of this type of folded sheet material, comprises a second set of folds 14 having only a single fold.

By making the whole sheet fold up into a size similar to that of a credit card, it can be placed in a standard credit card wallet. This is particularly the case if the disc 8 comprises a flat sheet of material. The sheet can comprise, for example, one or more maps, can be a phrase sheet, a calorie sheet, a currency converter, a sheet showing time regions of the world or can comprise sporting information. The disc can be used to display selected information through the cut-out or transparent section, such as sporting world record data.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be placed by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination of the steps of any method or process so disclosed.

What is claimed is:

1. A sheet material having a first set of folds, the sheet material further comprising a rotatable disc attached thereto, in which the sheet material is provided with a stiff portion at a segment thereof, and in which the segment at which the stiff portion is provided is at a corner of the sheet and is defined by at least one fold or edge of the sheets.

2. A sheet material according to claim 1, in which the first set of folds is concertina folds.

3. A sheet material according to claim 1, in which the rotatable disc is attached to the stiff portion of the sheet material.

4. A sheet material according to claim 3, in which the rotatable disc is located on the exterior surface of the stiff portion when the sheet is in the folded condition.

5. A sheet material according to claim 3, in which the stiff portion to which the rotatable disc is attached has a cut-out section which facilitates rotation of the disc.

6. A sheet material according to the claim 1, in which the disc comprise one or more cut-out sections or slots, such that information given on the stiff portion may be selectively viewed through the cut-out sections or slots, such that information given on the stiff portion may be selectively viewed through the cut-out section(s) or slots.

7. A sheet material according to claim 6, in which the disc comprises selectively translucent sections.

8. A sheet material according to claim 6, in which the disc comprises selectively transparent sections.

9. A sheet material according to claim 1, in which the disc comprises cardboard material, plastics material or a combination thereof.

10. A sheet material according to claim 9, in which the plastics material comprises opaque and transparent sections.

11. A sheet material according to claim 9, in which the disc further comprises markings on the surface thereof.

12. A sheet material according to claim 1, in which the disc is a substantially flat disc.

13. A sheet material according to claim 1, in which the disc comprises a projection on the surface thereof, which projection helps or provides for rotation of the disc.

14. A sheet material according to claim 1, in which the disc is connected to the sheet material at the centre of the disc by attachment means.

15. A sheet material according to claim 14, in which the disc rotates about the attachment means.

16. A sheet material according to claim 1, in which the sheet material further comprises a second stiff portion located at a segment of the sheet, which segment is defined by at least one of the edge or fold of the sheet.

17. A sheet material according to claim 16, in which the segments at which the first and second stiff portions are located are at or near diagonally opposite corners of the sheet.

18. A sheet material according to claim 1, in which the sheet material comprises a second set of folds, and in which the sheet is rectangular, the sets of folds being mutually perpendicular and parallel to the respective edges of the sheet, and the portions being such as to be at the outside of the sheet when is has been folded by the first set of folds and then by the second set of folds and being at least as large as the respective segments of the sheet.

19. A sheet material having a first set of folds, the sheet material further comprising a rotatable disc attached thereto and the sheet material comprises a second set of folds.

20. A sheet material according to claim 19, in which the second set of folds is a set of concertina folds.

21. A sheet material according to claim 20, in which the second set of folds is arranged so as to be transverse to the first set of concertina folds.

22. A sheet material according to claim 19, in which the sheet is rectangular, the sets of folds being mutually perpendicular and parallel to the respective edges of the sheet, and the stiff portions being such as to be at the outside of the sheet when it has been folded by the first set of folds and then by the second set of folds and being at least as large as the respective segments of the sheet.

23. A sheet material according to claim 19, in which the rotatable disc is located on the exterior surface of a stiff portion when the sheet is in the folded condition.

24. A sheet material according to claim 19, in which the rotatable disc is attached to a stiff portion of the sheet material.

25. A sheet material having a first set of folds, and a second set of folds the sheet material further comprising a rotatable disc attached thereto and a stiff portion attached to the sheet material.

* * * * *